United States Patent [19]

White

[11] Patent Number: 4,549,443
[45] Date of Patent: Oct. 29, 1985

[54] MULTI-SPEED REVERSIBLE TRANSMISSION OF COUNTERSHAFT CONSTRUCTION

[75] Inventor: Basil White, Rockford, Ill.

[73] Assignee: Twin Disc, Incorporated, Racine, Wis.

[21] Appl. No.: 558,810

[22] Filed: Dec. 7, 1983

[51] Int. Cl.[4] .................. F16H 3/08; F16H 37/00; F16H 3/44; F16D 19/00

[52] U.S. Cl. .................................. 74/360; 74/331; 74/333; 74/740; 74/786; 74/15.66; 192/87.11; 192/87.13

[58] Field of Search ............... 74/360, 359, 331, 333, 74/329, 740, 785, 786, 15.66; 192/20, 87.1, 87.11, 87.13, 87.14-87.19

[56] References Cited

U.S. PATENT DOCUMENTS

| | | | |
|---|---|---|---|
| 2,853,890 | 9/1958 | Kelbel | 74/740 X |
| 3,232,125 | 2/1966 | Lee et al. | 74/360 X |
| 3,243,026 | 3/1966 | Snoy et al. | 192/87.17 |
| 3,425,293 | 2/1969 | Krawczyk | 192/3.57 X |
| 3,429,202 | 2/1969 | Galicher | 74/740 |
| 3,572,167 | 3/1971 | Bosko et al. | 74/740 |
| 3,597,998 | 8/1971 | Ebert | 74/15.66 X |
| 3,673,890 | 7/1972 | Crooks | 74/740 X |
| 3,691,869 | 9/1972 | Klaue | 74/740 |
| 3,858,455 | 1/1975 | Sisson et al. | 74/360 |
| 3,893,345 | 7/1975 | Sisson et al. | 74/15.66 X |
| 3,916,710 | 11/1975 | Sisson et al. | 74/360 X |
| 3,916,714 | 11/1975 | Sisson et al. | 74/360 X |
| 4,090,414 | 5/1978 | White | 192/87.18 X |
| 4,145,935 | 3/1979 | Herlitzek | 74/360 X |
| 4,245,519 | 1/1981 | Herlitzek | 74/331 |
| 4,341,127 | 7/1982 | Stodt | 74/360 |
| 4,388,843 | 6/1983 | Teeter | 74/15.66 X |
| 4,392,391 | 7/1983 | Jameson et al. | 74/359 X |

FOREIGN PATENT DOCUMENTS 2063394 6/1981 United Kingdom ................ 74/740

Primary Examiner—Leslie A. Braun
Assistant Examiner—Stephen Andrews
Attorney, Agent, or Firm—James E. Nilles

[57] ABSTRACT

A power transmission utilizing only eleven gears and four shafts to obtain six forward speeds, three reverse speeds, and an 19-inch drop from input to output shafts. Optionally, there may be provided an inbuilt power-take-off and brake uniquely located with an 8-inch drop from the input shaft. A power transmission further expanded to obtain twelve forward speeds and six reverse speeds with addition of (1) a low-range planetary system, and (2) a direct clutch, each connectable between a journalled output gear to the output shaft.

6 Claims, 7 Drawing Figures

MULTI-SPEED REVERSIBLE TRANSMISSION OF COUNTERSHAFT CONSTRUCTION

BACKGROUND OF THE INVENTION

In prior art transmissions of the type to which the present invention pertains, duplex clutches were utilized in which the pistons were tied together at one side or the other and consequently only one or the other could be engaged; see for example U.S. Pat. No. 3,425,293 issued Feb. 4, 1969, to Krawczyk et al. In the U.S. Pat. No. 3,243,026 of Mar. 29, 1966, to Snoy et al. only one side of the duplex clutch is engaged at one time, as in the case of my U.S. Pat. No. 4,090,414 of May 28, 1978. The transmissions shown in those patents also required a large number of components, particularly gears, to perform functions of the present invention.

SUMMRY OF THE INVENTION

The present invention provides a power transmission which is simple, light-weight, economically produced, and utilizes a minimum number of components for the functions for which it was designed. A minimum number of gears are utilized to obtain six forward speeds and three reverse speeds to a gear journalled on the output shaft.

In the invention, four shafts are used, with the fourth shaft being the output shaft. There is a 19-inch offset or drop from the input shaft to this output shaft. The journalled gear is connectable to the output shaft through a speed reduction planetary system when a L0-clutch or brake is engaged. It is also connectable to the output shaft when a direct or H1-clutch is engaged. Thus, twelve speeds forward and six speeds reverse are available to the output shaft. Optionally, a modification is provided having an inbuilt power-take-off and brake uniquely located on the third shaft with an 8-inch drop from the input shaft.

DESCRIPTION OF PREFERRED EMBODIMENT

Figure 1:
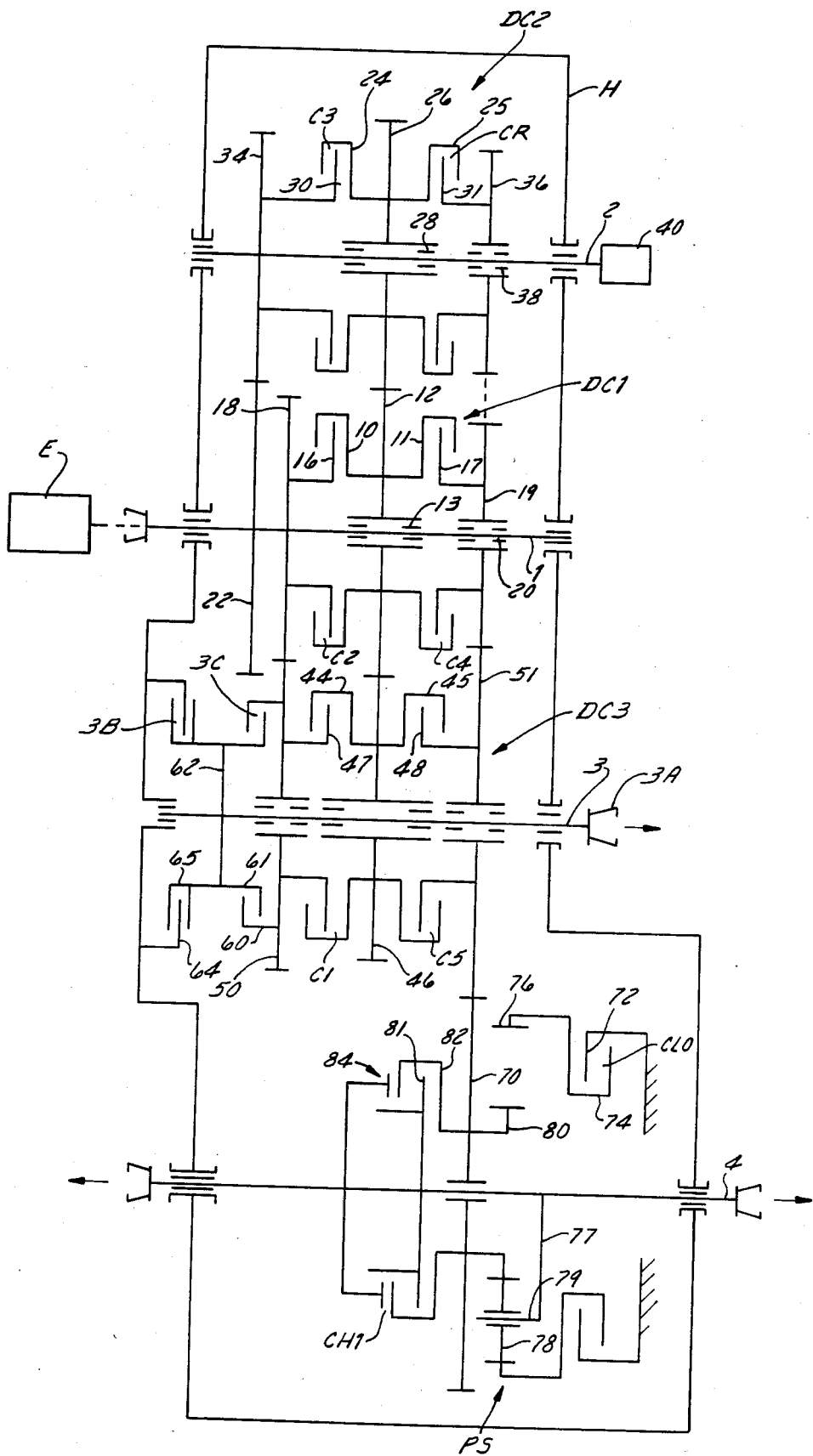
FIG. 1 is a schematic view of the transmission showing the form of the invention having four shafts, the interconnecting gears and clutches and the power-take-off (PTO)
Figure 2:
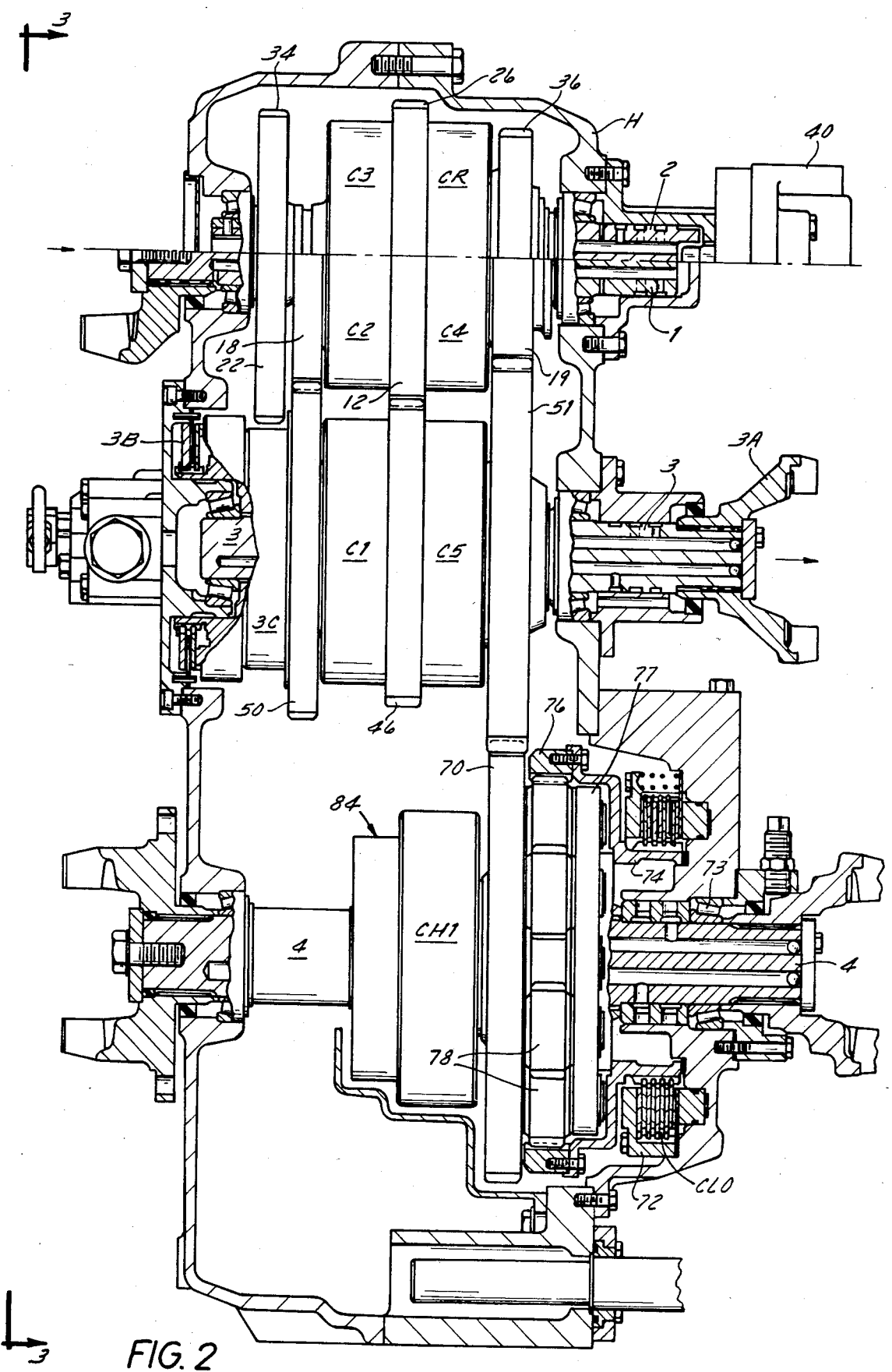
FIG. 2 is a side elevational view of the transmission shown in FIG. 1 but with certain parts broken away and with shaft 2 and its clutches moved to a position directly behind shaft 1.
Figure 3:
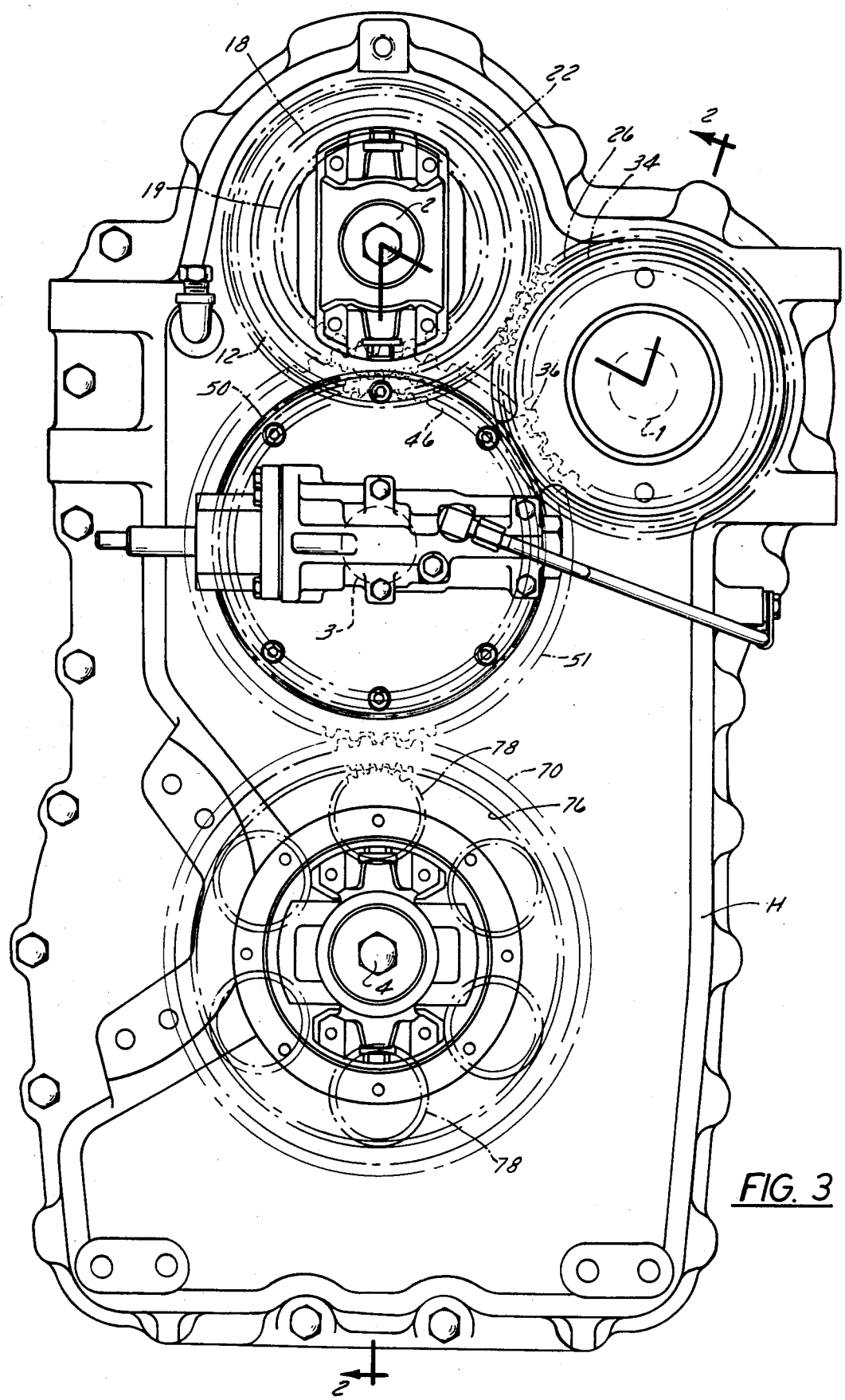
FIG. 3 is a vertical end view of the transmission shown in FIG. 2 and taken along the line 3—3 in FIG. 2 and showing the gears in phantom lines.

A schematic showing of the present transmission is shown in FIG. 1 and the general arrangement includes a housing H in which the various shafts are supported by anti-friction bearings of conventional character. The transmission includes an input shaft 1 which is driven by a power source such as an internal combustion engine E either directly or through a torque convertor or the like in the known manner. A second shaft 2 and a third shaft 3 are all arranged in parallelism, and shafts 1, 2 and 3 each have a duplex friction plate clutch DC1, DC2 and DC3 mounted thereon. Shaft 3 is an intermediate shaft and has a coupling 3A at its outwardly extending end. Shaft 3 may have a power-take-off brake 3B and a power-take-off clutch 3C connected therewith. The output shaft 4 has a conventional flanged coupling at either of its ends for connection to the load, such as the wheels of a tractor. Also associated with the output shaft 4 is a high-range clutch CH1, a low-range brake CL0, which also serves as master brake, and a planetary gear system PS.

The three duplex clutches DC1, DC2 and DC3 are of themselves of conventional nature and may be of the general type shown in the U.S. Pat. No. 3,425,293 to Krawczyk et al and which issued Feb. 4, 1969. However, in the Krawczyk patent, the pistons are tied together at one side or the other and only one can be applied at one time. The present design has individual pistons—both clutches of duplex pack can and are at times simultaneously engaged, other times only one is engaged, and sometimes neither are engaged. In the Snoy Pat. No. 3,243,026 which issued on Mar. 29, 1966, only one side of the clutch is engaged. In my Pat. No. 4,090,414 issued May 28, 1978, standard clutches of the said Snoy Pat. No. 3,243,026 type were included.

A detailed description of the structure and operation of these prior duplex clutches is not believed to be either necessary or desirable, and instead only a brief description of them will be made.

The duplex clutch DC1 carried on input shaft 1 includes the lamella carriers 10 and 11 which are rigidly fixed with a large central gear 12 and which in turn is rotatably mounted on shaft 1 by the anti-friction bearings 13. Carriers 10 and 11 cooperate respectively with the lamella carriers 16 and 17. Carrier 16 is fixed to the gear 18 that in turn is fixed with shaft 1 as by being splined therewith. The lamella carrier 17 is rigidly secured with a gear 19 which in turn is mounted by anti-friction bearings 20 to the shaft 1. Gear 12 is in constant mesh with gear 26 of shaft 2 and gear 46 of shaft 3. Shaft 1 also has an input gear 22 fixed therewith.

The duplex clutch DC2 includes the lamella carriers 24 and 25 which are rigidly secured with the central gear 26 which in turn is rotatably mounted on the shaft 2 by the anti-friction bearings 28. Lamella carriers 30 and 31 cooperate respectively with carriers 24 and 25 in the known manner so as to be clamped up or disengaged as desired. Carrier 30 and the gear 34 are fixed together by both being splined or fixed to shaft 2. Gear 34 is in constant mesh with gear 22. Lamella carrier 31 is rigidly fixed to gear 36 for rotation therewith, gear 36 being rotatably journalled on shaft 2 by the anti-friction bearing member 38. Gear 36 meshes with gear 51 of shaft 3. A fluid pump 40 is secured to shaft 2 and is driven thereby so as to provide pressure fluid to the various clutches through the rifle drilling and other passageways in the shafts and in the known manner. Pressure fluid is also furnished through some of the passages shown so as to lubricate the various bearings in the known manner.

The duplex clutch DC3 mounted on the intermediate shaft 3 includes the lamella carriers 44 and 45 fixed to gear 46 which in turn is journalled on the shaft 3. Lamella carriers 47 and 48 cooperate with carriers 44 and 45, respectively, and carrier 47 is rigidly fixed to the gear 50 while carrier 48 is fixed to gear 51, both gears of which are journalled for rotation on shaft 3 on the antifriction bearings as indicated in the drawings.

The intermediate shaft 3 may have a power-take-off clutch 3C and a power-take-off brake 3B connectable therewith as follows.

The power-take-off clutch 3C includes the lamella carrier 60 secured to the gear 50 and the cooperating lamella carrier 61 which is rigidly secured by member 62 which is splined to the shaft 3.

The power-take-off brake 3B includes the lamella carrier 64 which is fixed or anchored to the housing and the cooperating lamella carrier 65 which is also secured to the shaft 3 by means of member 62. In this manner, the intermediate shaft can be selectively anchored to the housing H by the brake 3B or engaged by clutch 3C with gear 50 for being driven from shaft 1.

Gear 51, journalled on shaft 3, is in constant mesh with gear 19 of shaft 1, gear 36 of shaft 2 and also with output gear 70 journalled for rotation on output shaft 4.

The master low-range clutch CL0 includes the lamella carrier 72 which is grounded to housing H, and the cooperating lamella carrier 74 is fixed to a planet ring gear 76 for rotation therewith. The planetary gear system PS includes the planet carrier 77 which has a plurality of pinion gears 78 fixed to the carrier on their cantilevered pinion shafts 79. The planetary sun gear 80 is fixed to the gear 70 for rotation thereby. Thus, it will be noted that the output planetary system PS has a simple carrier with cantilevered pinion shafts, and the master or planetary brake CL0 is axially offset from the planetary ring gear 76 of system PS.

Figure 6:
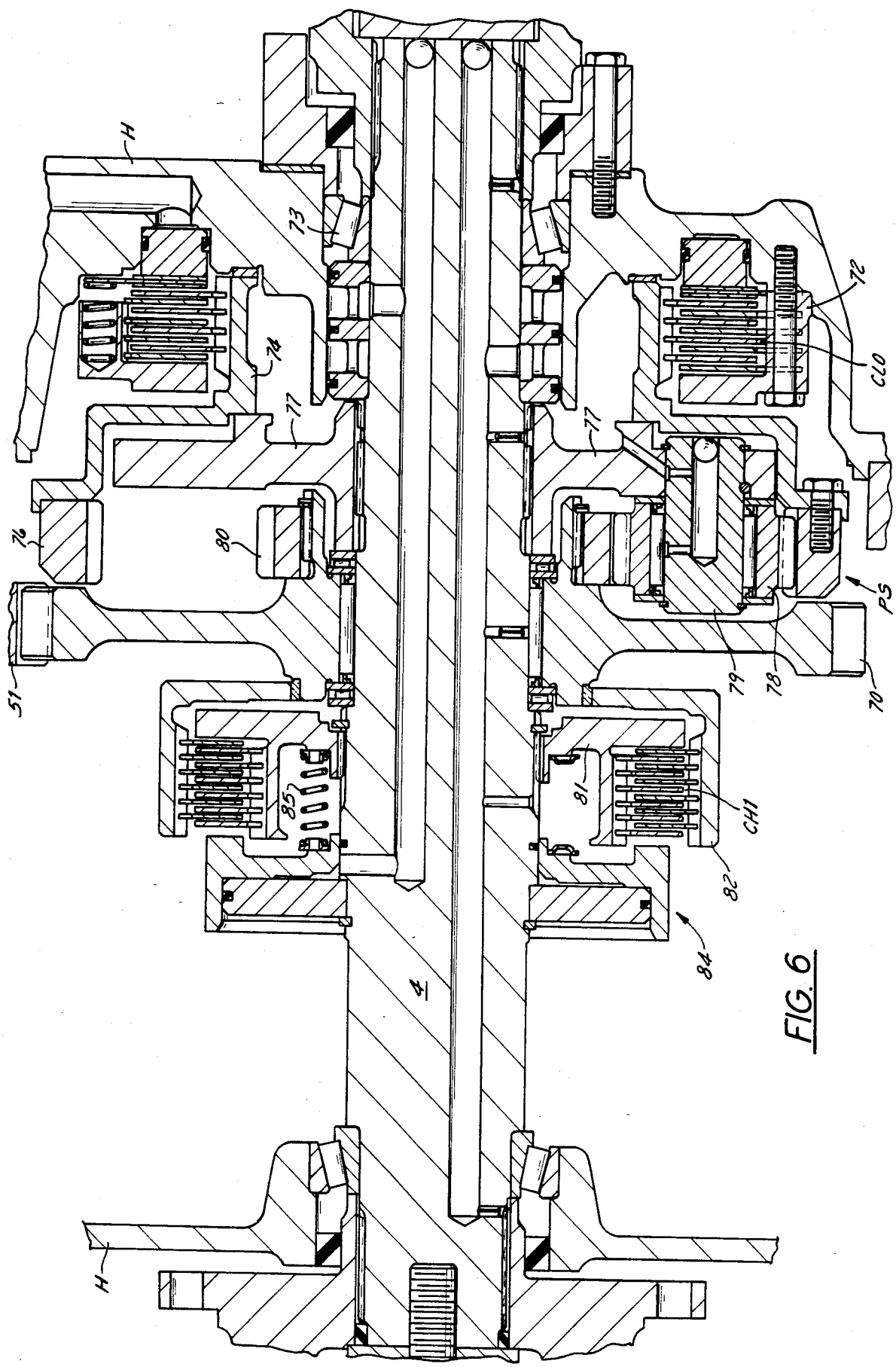
FIG. 6 is a longitudinal cross-sectional view through the output shaft, shaft 4, and its clutches as shown in FIG. 2 but on an enlarged scale.

The high-range clutch CH1 includes the lamella carrier 81 which is fixed to the output shaft 4 and the cooperating lamella carrier 82 is fixed to the gear 70. The hydraulically actuated clutch clamp-up member 84 is mounted on the shaft 4 and acts to clamp up the high-range clutch CH1 or permit it to be released by its springs 85 (FIG. 6) in the known manner.

The above transmission is a constant mesh gearing and power connectible through the engagement of the hydraulically actuated, multiple friction plate clutches. The transmission utilizes three identical gear and duplex clutch assemblies, each centrally supported by the antifriction bearing on each of the three shafts 1, 2 and 3. This arrangement provides an efficiently and economically produced transmission and simplifies the stocking of service parts.

The above transmission utilizes only four shafts in an 19-inch vertical drop between the input and output shaft centers.

The planetary, master clutch CL0 grounds out or anchors the ring gear 76 of the low range planetary system PS and is located at the rear of the output shaft. This clutch CL0 serves as the master clutch and/or also serves as the "inching" clutch, and it is serviceable without removing the transmission from a vehicle.

The design construction at the upper three shaft locations, that is, shafts 1, 2 and 3, is simplified in that there are a minumum of splined connections to the shafts.

Figure 4:
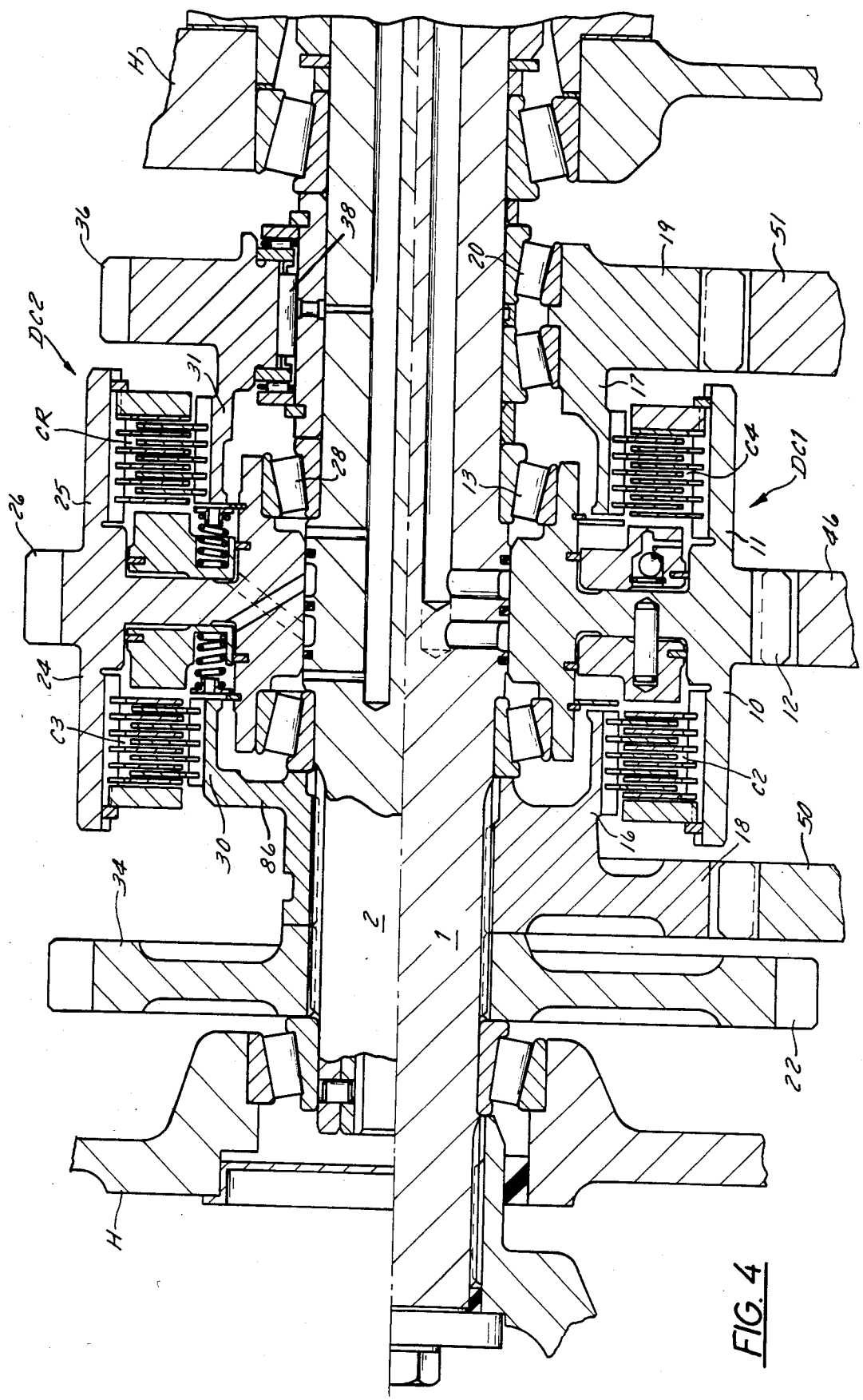
FIG. 4 is a longitudinal cross-sectional view through shafts 1 and 3, the lower half of FIG. 4 being a cross-section through shaft 1, that is the input shaft, and the upper half of FIG. 4 being a cross-sectional view through the high-input and reverse shaft 2 and its associated clutches, the view being enlarged from that shown in FIG. 2.
Figure 5:
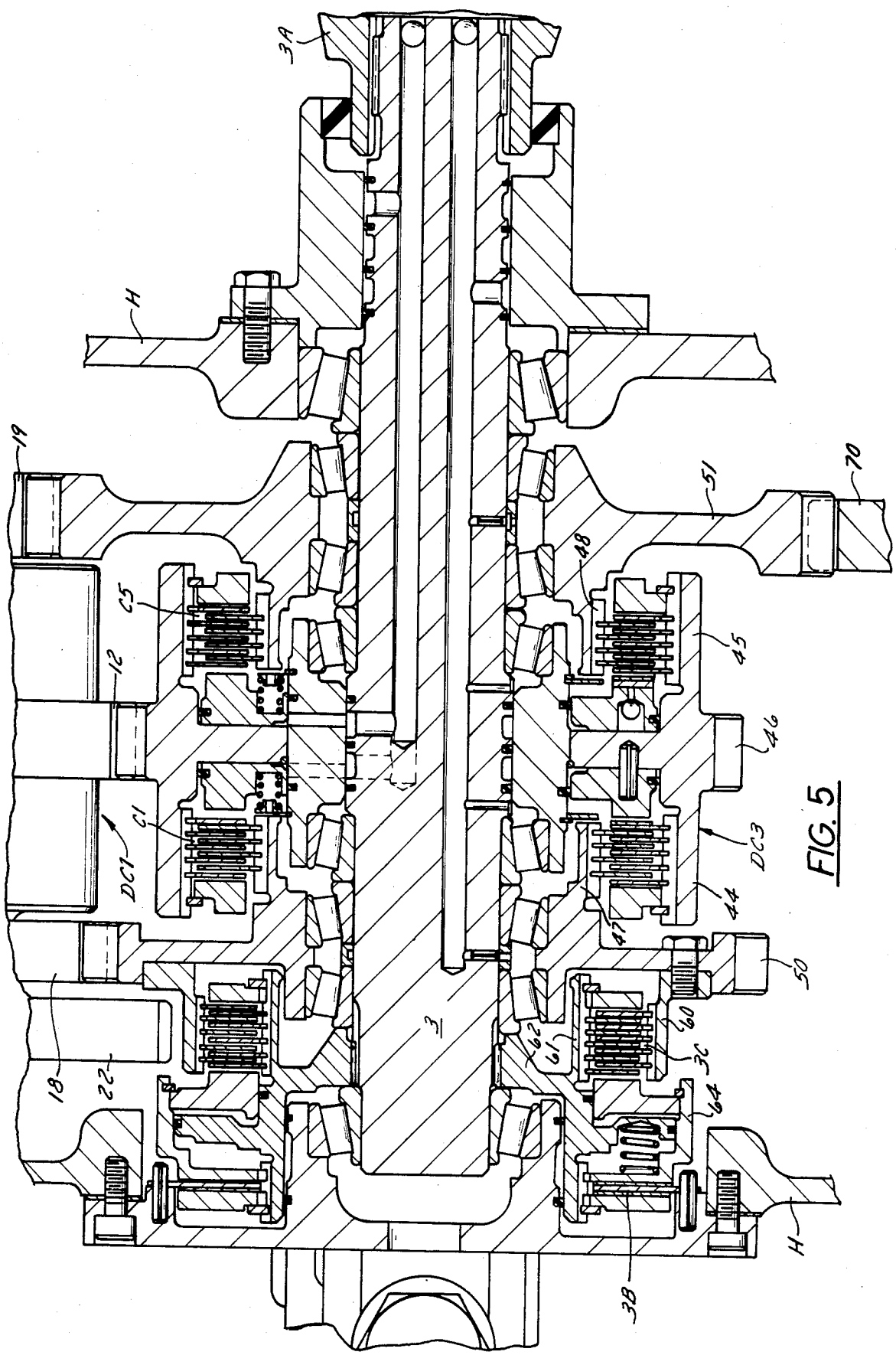
FIG. 5 is a longitudinal cross-sectional view through the intermediate shaft, shaft 3, as shown in FIG. 2, but on an enlarged scale.

As shown in FIG. 4, a separate clutch hub carrier 86 of ductile iron casting is splined to the high-input reverse direction shaft 2. Gear 34 is also splined to shaft 2. This simplifies the gear forging and also the lamella carrier. There is no requirement for localized induction hardening since the shafts do not serve as inner races for roller bearings, and machineable hardness steel is adequate for strength purposes.

The twelve various forward gear ratios are obtained by power flow coming in through input shaft 1 and through the gears and clutches and then out of the output shaft 4, as follows:

for 1st gear, power is transmitted through gears 18, 50, clutch C1, gears 46, 12, clutch C4, gears 19, 51, 70, and then the planetary reduction system PS; clutch CL0 holds or grounds gear 76 to the housing H;

for 7th gear, power is transmitted through gears 18, 50, clutch C1, gears 46, 12, clutch C4, gears 19, 51, 70, and clutch CH1;

for 2nd gear, power is transmitted through the hub of gear 18, clutches C2 and C4, gears 19, 51, 70, and planetary system PS;

for 8th gear, power is transmitted through the hub of gear 18, clutches C2 and C4, gears 19, 51, 70, and clutch CH1;

for 3rd gear, power is transmitted through gears 22 and 34, clutch C3, gear 26, gear 12, clutch C4, gears 19, 51, 70, and planetary system PS;

for 9th gear, power is transmitted through gears 22 and 34, clutch C3, gear 26, gear 12, clutch C4, gears 19, 51, 70, and clutch CH1;

for 4th gear, power is transmitted through gear 18, gear 50, clutches C1 and C5, gears 51, 70, and planetary system PS;

for 10th gear, power is transmitted through gear 18, gear 50, clutches Cl and C5, gears 51, 70, and clutch CH1;

for 5th gear, power is transmitted through the hub of gear 18, clutch C2, gears 12, 46, clutch C5, gears 51, 70, and planetary system PS;

for 11th gear, power is transmitted through the hub of gear 18, clutch C2, gears 12, 46, clutch C5, gears 51, 70, and clutch CH1;

for 6th gear, power is transmitted through gears 22 and 34, clutch C3, gears 26, 12, 46, clutch C5, gears 51, 70, and planetary system PS;

for 12th gear, power is transmitted through gears 22 and 34, clutch C3, gears 26, 12, 46, clutch C5, gears 51, 70, and clutch CH1;

Six reverse gear ratios are obtained by power flow from shaft 1 through the clutches and gears and out of shaft 4 as follows:

for 1st reverse gear, power is transmitted through gears 18 and 50, clutch C1, gears 46, 12, 26, clutch CR, gears 36, 51, 70, and planetary system PS;

for 4th reverse gear, power is transmitted through gears 18 and 50, clutch Cl, gears 46, 12, 26, clutch CR, gears 36, 51, 70, and clutch CH1;

for 2nd reverse gear, power is transmitted through the hub of gear 18, clutch C2, gears 12, 26, clutch CR, gears 36, 51, 70, and planetary system PS;

for 5th reverse gear, power is transmitted through the hub of gear 18, clutch C2, gears 12, 26, clutch CR, gears 36, 51, 70, and clutch CH1;

for 3rd reverse gear, power is transmitted through gears 22 and 34, clutch C3, clutch CR, gears 36, 51, 70, and planetary system PS;

for 6th reverse gear, power is transmitted through gears 22 and 34, clutch C3, clutch CR, gears 36, 51, 70, and clutch CH1.

The present invention provides simplicity of design and versatility of three identical gear and duplex clutch assemblies which serve as connectors between a three-speed input section and a two-speed forward and one-speed reverse intermediate section.

There are three identical gear and duplex clutch assemblies—each centrally located and supported by two tapered roller bearings—and one on each of the three upper shafts 1, 2 and 3. Each duplex clutch has a central gear which serves as the housing for two identical clutch apply pistons—one piston to either side of the symmetrical gear web section. Thus, each duplex clutch has a clutch at each of its sides and each clutch in turn has a gear at its side and driven thereby. The hydraulic pressure apply pistons are of the conventional ball dump type and are spring returned to the unapplied position when hydraulic apply pressure is released. Passage of hydraulic pressure medium to the apply pistons is conventional and through radially drilled holes with entry being at the intersection of the gear web and gear hub O.D. location.

When C1 clutch is applied, all three gear and duplex clutch assemblies are rotated at a speed reduction ratio of, for example, 1.1944:1; when C2 clutch is applied, they are rotated at 1.000:1 speed ratio; and when C3 clutch is applied, they are rotated at a speed increasing ratio, for example, of 1.1944:1. At no time are any of the above three clutches simultaneously engaged.

The present invention provides a twelve-speed forward, three-speed reverse transmission, or optionally an additional three higher reverse speeds.

In summary, in the above form of the present transmission, i.e., the four-shaft, countershaft transfer section, gear 51 is journalled on shaft 3, and a gear 70 is journalled on the fourth shaft 4, and from gear 70 there are two optional power paths—one is to the sun gear 80 of the simple-speed reduction planetary, and out the carrier 77 to shaft 4 when clutch CL0 is engaged to hold ring gear 76 to the housing H. The other power path is a direct connection from gear 70 to shaft 4 when clutch CH1 is engaged.

Thus, the six speeds forward and three speeds reverse of the countershaft/transfer section are through the planetary system for the first six forward speeds and the three reverse speeds. In addition, these same six forward countershaft/transfer speeds—in same sequence—are through the high speed clutch CH1 to shaft 4 for the next six forward speeds 7th through 12th. Three high speed reverse speeds are provided through clutch CH1 for the additional reverse speeds 4th through 6th.

As previously stated, clutch CL0 is used as the master or inching clutch (operational in lowest speed ranges only). With brake CL0 completely disengaged, there is no output power delivery. With controlled lower apply pressure to brake CL0, this brake grounding ring gear 76 to housing H can be slipped at torque levels considerably less than the maximum possible from the power source. The result is a controlled low output power until a maximum predetermined slip torque level is achieved—at which time the brake—on a rate of rise pressure apply schedule—will fully lock the ring gear 76 to the housing H. Then, full power is transmitted from carrier 77 to shaft 4.

Figure 7:
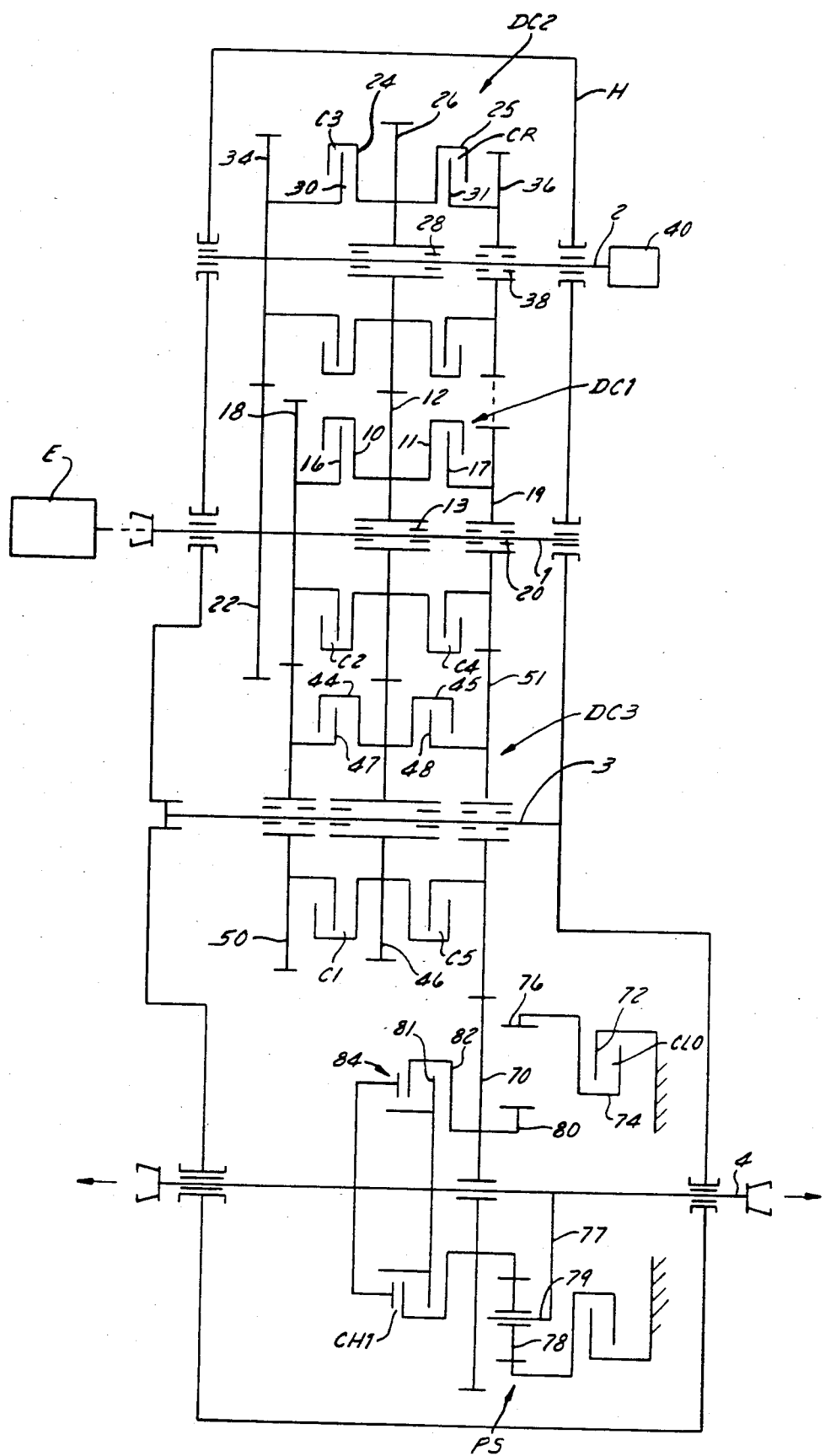
FIG. 7 is a modification of FIG. 1 but without the PTO.

A modified form of the invention is shown in FIG. 7 and parts corresponding to the transmission shown in FIG. 1 have been correspondingly numbered. The transmission shown in FIG. 7 does not have the optional power-take-off 3A nor the brake 3B nor clutch 3C on shaft 3. The ends of shaft 3 are fixed in the housing H and are not bearing supported.

I claim:

1. A multi-speed reversible transmission of the countershaft construction type for providing twelve forward speeds and six reverse speeds and comprising a housing, four shafts mounted in said housing and arranged in parallelism; said shafts including a power input shaft, a power output shaft, an intermediate shaft, and a high-input and reverse direction shaft; said power input shaft, said high-input and reverse direction shaft and said intermediate shaft each having a duplex clutch mounted thereon; each duplex clutch have two clutches arranged side-by-side, each clutch having a gear at one side thereof and driveable thereby, each duplex clutch also having a central gear forming a pair of clutch actuating pressure chambers and said central gears being rotatably mounted on their respective shaft, said central gear of said input shaft duplex clutch being in constant mesh with the said central gears of said other two duplex clutches, said power input shaft also having an input gear fixed thereto for delivering power to one of said clutch side gears of said high-input and reverse shaft, said output shaft having an output gear rotatably journalled thereon and in constant mesh with one of the clutch side gears of said intermediate shaft and driven thereby, said output shaft also having a high-speed range clutch detachably connected between said output shaft and said output gear, a low-speed range brake anchored in said housing, said output shaft also having a planetary gear system driven by said output gear and connected between said output gear and said low-speed range brake, whereby either said high-speed range clutch or said low-speed range brake can be used selectively with said output gear to permit drive to said output shaft.

2. The transmission set forth in claim 1 further characterized in that said intermediate shaft has a power-take-off at one end and also has a brake for anchoring said intermediate shaft to said housing when said brake is engaged.

3. The transmission as described in claim 2 including a power-take-off clutch disengagably connected between (1) one of said side gears of said duplex clutch on said intermediate shaft and (2) said intermediate shaft, whereby said intermediate shaft can be releasably driven.

4. The transmission set forth in claim 1 further characterized in that said clutches are of the hydraulically actuated, multiple friction plate type.

5. The transmission set forth in claim 1 further characterized in that said planetary gear system is axially offset along said output shaft from said low-speed range clutch.

6. The transmission as described in claim 3 further characterized in that said planetary gear system includes pinion gears mounted on cantilevered pinion gear shafts.

* * * * *